(12) United States Patent
Tong et al.

(10) Patent No.: US 12,068,975 B2
(45) Date of Patent: Aug. 20, 2024

(54) RESOURCE SCHEDULING METHOD AND SYSTEM, ELECTRONIC DEVICE, COMPUTER READABLE STORAGE MEDIUM

(71) Applicant: ZTE CORPORATION, Guangdong (CN)

(72) Inventors: Yao Tong, Guangdong (CN); Haixin Wang, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 18/027,664

(22) PCT Filed: Sep. 15, 2021

(86) PCT No.: PCT/CN2021/118436
§ 371 (c)(1),
(2) Date: Mar. 22, 2023

(87) PCT Pub. No.: WO2022/062981
PCT Pub. Date: Mar. 31, 2022

(65) Prior Publication Data
US 2023/0379268 A1    Nov. 23, 2023

(30) Foreign Application Priority Data
Sep. 22, 2020   (CN) .......................... 202011001012.8

(51) Int. Cl.
*H04L 47/70*    (2022.01)
*H04L 47/78*    (2022.01)
(52) U.S. Cl.
CPC .......... *H04L 47/822* (2013.01); *H04L 47/781* (2013.01); *H04L 47/823* (2013.01)

(58) Field of Classification Search
CPC .... H04L 47/822; H04L 47/823; H04L 47/781
See application file for complete search history.

(56) References Cited

U.S. PATENT DOCUMENTS 8,656,406 B2 * 2/2014 Nakayama .......... H04L 67/1029
718/105
8,762,531 B1 * 6/2014 Yemini ................. G06F 9/5077
370/254

(Continued)

FOREIGN PATENT DOCUMENTS

CN    105553721 A    5/2016
CN    108924139 A    11/2018
(Continued)

OTHER PUBLICATIONS

WIPO, International Search Report issued on Dec. 14, 2021.
Japan Patent Office, First Office Action issued Mar. 5, 2024 for application No. JP2023-518479.

*Primary Examiner* — Dhairya A Patel
(74) *Attorney, Agent, or Firm* — Li & Cai Intellectual Property (USA) Office

(57) ABSTRACT

The present disclosure relates to the field of communication technology, and provides a resource scheduling method including: acquiring utilization rates of resources of a plurality of proxy servers, the plurality of proxy servers being deployed on a virtual machine; and using at least one first proxy server to share a utilization of resources of at least one second proxy server, where the utilization rate of resources of each of the at least one first proxy server is smaller than a first threshold, the utilization rate of resources of each of the at least one second proxy server is greater than a second threshold, and the first threshold is smaller than the second threshold.

10 Claims, 3 Drawing Sheets

(56) References Cited

U.S. PATENT DOCUMENTS

| | | | |
|---|---|---|---|
| 10,379,922 B1* | 8/2019 | Bell | G06F 11/0712 |
| 11,636,379 B2* | 4/2023 | Zhou | G06F 9/3828 |
| | | | 706/10 |
| 2007/0233838 A1* | 10/2007 | Takamoto | G06F 9/5077 |
| | | | 709/226 |
| 2010/0030877 A1* | 2/2010 | Yanagisawa | G06F 9/5077 |
| | | | 709/221 |
| 2015/0249615 A1* | 9/2015 | Chen | G06F 9/45558 |
| | | | 709/226 |
| 2016/0004552 A1* | 1/2016 | Innan | G06F 9/5088 |
| | | | 718/1 |
| 2016/0285832 A1* | 9/2016 | Petrov | H04L 67/60 |
| 2017/0201574 A1* | 7/2017 | Luo | H04L 67/34 |
| 2017/0272515 A1* | 9/2017 | Sanderson | G06F 3/0683 |
| 2017/0315838 A1* | 11/2017 | Nidugala | H04L 43/0817 |
| 2019/0220369 A1 | 7/2019 | Liu et al. | |
| 2020/0314171 A1* | 10/2020 | Featonby | G06F 9/45558 |
| 2020/0344322 A1* | 10/2020 | Zhu | H04L 47/821 |
| 2021/0019171 A1* | 1/2021 | Tong | G06F 9/45558 |
| 2023/0267015 A1* | 8/2023 | Tong | G06F 9/4881 |
| | | | 718/104 |
| 2023/0281001 A1* | 9/2023 | Gopalapura Venkatesh | |
| | | | G06F 3/0647 |
| | | | 726/24 |
| 2024/0048530 A1* | 2/2024 | Shevade | H04L 43/08 |

FOREIGN PATENT DOCUMENTS

| | | |
|---|---|---|
| CN | 110597631 A | 12/2019 |
| JP | 2015159436 A | 9/2015 |
| WO | 2008102739 A1 | 8/2008 |

* cited by examiner

RESOURCE SCHEDULING METHOD AND SYSTEM, ELECTRONIC DEVICE, COMPUTER READABLE STORAGE MEDIUM

CROSS-REFERENCE TO RELATED APPLICATIONS

The present application claims priority to the Chinese Patent Application No. 202011001012.8 filed on Sep. 22, 2020, the entire contents of which are incorporated herein by reference.

TECHNICAL FIELD

The present disclosure relates to the field of communication technology.

BACKGROUND

With popularization of Internet and development of broadband infrastructure construction, an expectation of users for network videos is significantly increased. Each network video website covers more than 94% of internet users, the network video website, information, mailbox, Instant Messaging (IM) and the like become basic applications of the Internet.

SUMMARY

In an aspect, the present disclosure provides a resource scheduling method, including: acquiring utilization rates of resources of a plurality of proxy servers, the plurality of proxy servers being deployed on a virtual machine; and using at least one first proxy server to share a utilization of resources of at least one second proxy server, where the utilization rate of resources of each of the at least one first proxy server is smaller than a first threshold, the utilization rate of resources of each of the at least one second proxy server is greater than a second threshold, and the first threshold is smaller than the second threshold.

In another aspect, the present disclosure provides a resource scheduling system, including a scheduling server, and a plurality of proxy servers deployed on a virtual machine; the scheduling server is configured to acquire utilization rates of resources of the plurality of proxy servers, and use at least one first proxy server to share a utilization of resources of at least one second proxy server, where the utilization rate of resources of each of the at least one first proxy server is smaller than a first threshold, the utilization rate of resources of each of the at least one second proxy server is greater than a second threshold, and the first threshold is smaller than the second threshold.

In further another aspect, the present disclosure provides an electronic device including: at least one processor; and a memory communicatively connected with the at least one processor; the memory stores instructions to be executed by the at least one processor, the instructions, executed by the at least one processor, cause the at least one processor to perform the method provided in the present disclosure.

In still another aspect, the present disclosure provides a computer-readable storage medium having a computer program stored thereon, the computer program, executed by a processor, causes the processor to perform the method provided in the present disclosure.

DETAIL DESCRIPTION OF EMBODIMENTS

Figure 1:
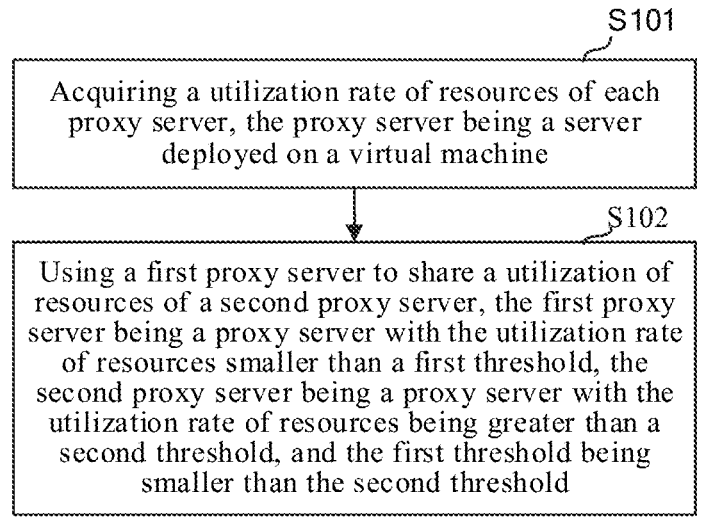
FIG. 1 is a flowchart illustrating a resource scheduling method.

In order to make purposes, technical solutions, and advantages of the present application clearer, embodiments of the present application are described below with reference to the accompanying drawings. It should be understood by those of ordinary skill in the art that, in the embodiments of the present application, many technical details are proposed to enable readers to better understand the present application. However, the technical solutions claimed in the present application may be implemented without these technical details and various changes and modifications based on the following embodiments. The following embodiments are divided for convenience of description, and should not limit implementations of the present application, and the embodiments of the present application may be combined and quoted with each other if no conflict is incurred.

Video services of existing network video websites are deployed based on physical machines, and load scheduling is performed through a front-end service proxy server. However, uses of resources (such as bandwidth, central processing unit (CPU), memory and the like) of each network video website usually fluctuate, and there may be a case where resources of part of physical machines are utilized too much at a peak, which causes that service quality of the website cannot be effectively guaranteed, and affects user experience.

A first implementation of the present disclosure relates to a resource scheduling method, in which utilization rates of resources of proxy servers are acquired, and the proxy servers are servers deployed on a virtual machine; a first proxy server is used for sharing a utilization of resources of a second proxy server, the first proxy server is a proxy server with the utilization rate of resources smaller than a first threshold, the second proxy server is a proxy server with the utilization rate of resources greater than a second threshold, the first threshold is smaller than the second threshold. Resources of the proxy servers are recombined through a virtualization technology, the proxy server with a relatively low utilization rate of resources is used to share the utilization of resources of the proxy server with a relatively high utilization rate of resources (i.e., part of utilized resources of the proxy server with the relatively high utilization rate of resources are provided by the proxy server with the relatively low utilization rate of resources), and a flexible allocation of the resources can be achieved, so that the utilization rate of resources of each proxy server is kept in a reasonable range, the service quality of the website is effectively guaranteed, and the user experience is improved.

It should be noted that an execution body of the resource scheduling method provided in the first implementation may be a service end connected with the proxy servers, the service end may be implemented by an independent server or a server cluster formed by a plurality of servers. In some implementations, the service end may be connected with an access server connected with a client and configured to process a request initiated by the client.

A specific flow of the resource scheduling method provided in the first implementation is shown in FIG. 1, and includes following operation S101 and S102.

At operation S101, acquiring a utilization rate of resources of each proxy server, the proxy server being a server deployed on a virtual machine.

The proxy server is a server virtualized by the virtual machine from a physical server through the virtualization technology, the physical server is a host machine of the proxy server, and each physical server may correspond to more than one virtualized proxy server.

The utilization rate of resources of the proxy server refers to a proportion of resources, being utilized, of the proxy server, the resources may include bandwidth resources, computing resources (including central processing unit (CPU) or graphics processing unit (GPU)), storage (including memory) resources, and the like of the proxy server. The computing resources and the storage resources may be collectively referred to as processing resources, representing a processing capacity of the proxy server. It should be noted that, in some implementations, the resources of the proxy server may refer to at least one of the above resources.

In some implementations, the resources of the proxy server are bandwidth resources, and the proxy server is a server configured to provide a cloud video service.

At operation S102, using a first proxy server to share a utilization of resources of a second proxy server, the first proxy server being a proxy server with the utilization rate of resources smaller than a first threshold, the second proxy server being a proxy server with the utilization rate of resources greater than a second threshold, and the first threshold being smaller than the second threshold.

The first threshold and the second threshold may be configured according to practical experiences or practical situations, for example, the first threshold may be 20%, 30%, 40%, or the like, and the second threshold may be 70%, 80%, 90%, or the like.

In an example, after using the first proxy server to share the utilization of resources of the second proxy server, in response to that there is a remaining first proxy server, the remaining first proxy server is to be recycled. Since the first proxy servers is a proxy server with a relatively low utilization rate of resources, the remaining first proxy server is recycled, so that a number of proxy servers can be reduced, and virtual resources are saved. In some implementations, the remaining first proxy server may also be migrated to be used in other tenants.

In some implementations, the proxy server with a utilization rate of resources between the first threshold and the second threshold may not be processed, or may share the utilization of resources of the second proxy server in response to that the first proxy server cannot share the utilization of resources of the second proxy server. In some implementations, after using the first proxy server to share the utilization of resources of the second proxy server, there is still a utilization of resources of another second proxy server not shared, at least one new proxy server is created to share the utilization of resources of the another second proxy server. During creating the new proxy server, the proxy server is preferentially created at a position proximity to the second proxy server, for example, the proxy server is preferentially created at a host (i.e., physical server) the same as that of the second proxy server, or at a physical server proximity to the host of the second proxy server.

In some implementations, before using the first proxy server to share the utilization of resources of the second proxy server, the resources of the second proxy server may be increased; and using the first proxy server to share the utilization of resources of the second proxy server includes: in response to that the utilization rate of resources of the second proxy server with the increased resources is still greater than the second threshold, using the first proxy server to share the utilization of resources of the second proxy server with the increased resources.

Specifically, the resources of the second proxy server may be increased firstly within a range allowed by a tenant quota through a virtualization technology. For example, if a quota of a certain second proxy server is a bandwidth of 20M, but only a bandwidth of 10M is currently available, the second proxy server may be firstly configured with the bandwidth of 20M, and then the utilization rate of resources of the second proxy server with the increased resources is acquired; if the utilization rate of resources of the second proxy server with the increased resources is smaller than or equal to the second threshold, the proxy server with the increased resources is removed from a list of second proxy servers; and if the utilization rate of resources of the second proxy server with the increased resources is still greater than the second threshold, the first proxy server is used to share the utilization of resources of the second proxy server with the increased resources.

In some implementations, for sharing the utilization of resources of the second proxy server by using the first proxy server, the first proxy server may be randomly selected to share the utilization of resources of the second proxy server.

In a specific example, before operation S102, the resource scheduling method further includes: sequencing first proxy servers according to a sequence of utilization rates of resources from low to high; the operation S102 of using the first proxy server to share the utilization of resources of the second proxy server includes: selecting first n proxy servers of the first proxy servers in a sequenced result to share the utilization of resources of the second proxy server, n being a positive integer.

For example, the utilization rates of resources of the first proxy servers are arranged into a queue from low to high, and the first proxy server is selected from a head of the queue (i.e., the utilization rate of resources of the first proxy server is relatively low) to share the utilization of resources of the second proxy server.

It should be understood that the utilization rate of resources fluctuates at any time, by selecting the first proxy server with the relatively low utilization rate of resources to share the utilization of resources of the second proxy server, the proxy server can more fully deal with the utilization of resources, and the service quality is ensured. In addition, selecting first n proxy servers of the first proxy servers in the sequenced result may include selecting preferentially the first n proxy servers of the first proxy servers in the sequenced result, i.e., for selecting the first proxy server to share the utilization of resources, the first n proxy servers of the first proxy servers in the sequenced result are selected first, and if the first n proxy servers of the first proxy servers in the sequenced result cannot share the utilization of resources of the second proxy server, other first proxy servers in the sequenced result except the first n proxy servers of the first proxy servers may be further selected to share the utilization of resources.

Similarly, second proxy servers may be sequenced according to a sequence of utilization rates of resources of the second proxy servers from low to high, and the first proxy server may be used to preferentially share the utilization of resources of the second proxy server with a higher utilization rate of resources.

According to the resource scheduling method in the first implementation, the proxy server with a relatively low utilization rate of resources is used to share the utilization of resources of the proxy server with a relatively high utilization rate of resources by acquiring utilization rates of resources of proxy servers on the virtual machine, and the resources of the proxy servers are reclaimed through the virtualization technology, and a flexible allocation of the resources can be realized, so that the utilization rate of resources of each proxy server is kept in a reasonable range, the service quality of the server (e.g., website) is effectively guaranteed, and the user experience is improved.

A second implementation of the present disclosure relates to a resource scheduling method, which is substantially same as that in the first implementation, but includes a difference that: in the second implementation, an expectation of utilization of resources of the second proxy server is predicted, and the utilization of resources of the proxy server is shared according to the expectation of utilization of resources.

Figure 2:
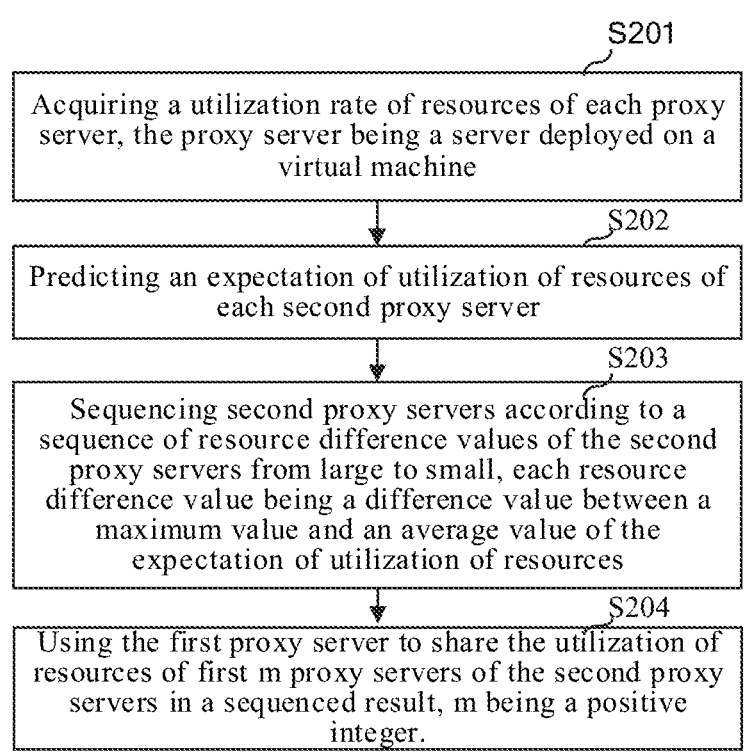
FIG. 2 is a flowchart illustrating a resource scheduling method.

A specific flow of the resource scheduling method provided in the second implementation is shown in FIG. 2, and includes following operations S201 to S204.

At operation S201, acquiring a utilization rate of resources of each proxy server, the proxy server being a server deployed on a virtual machine.

Operation S201 is same as operation S101, the relevant description thereof may refer to that in the first implementation, and thus is not repeated herein.

At operation S202, predicting an expectation of utilization of resources of each second proxy server.

The expectation of utilization of resources refers to a possible utilization rate of resources of the proxy server (i.e., a possible proportion of resources, being utilized, of the proxy server), for example, a utilization rate of resources of a certain proxy server is about 90% at a peak, and is about 20% at an off-peak, thus the expectation of utilization of resources of the proxy server ranges from about 20% to about 90%.

In some implementations, the expectation of utilization of resources of each second proxy server may be predicted according to historical data of the utilization rate of resources of the second proxy server, for example, historical data of the utilization rate of resources within one month is selected for prediction, but a time range for selecting the historical data may be set according to an actual expectation, and is not specifically limited here.

At operation S203, sequencing second proxy servers according to a sequence of resource difference values of the second proxy servers from large to small, each resource difference value being a difference value between a maximum value and an average value of the expectation of utilization of resources.

In some implementations, the maximum value of the expectation of utilization of resources may be a maximum value in the historical data, or may be an average value of the historical data at a peak, or may be obtained by performing certain modification according to the historical data; the average value of the expectation of utilization of resources may be an average value in the historical data, or may be a weighted average value of the historical data at a peak and at an off-peak, or may be specifically set according to an actual expectation, and is not specifically limited here.

At operation S204, using a first proxy server to share the utilization of resources of first m proxy servers of the second proxy servers in a sequenced result, m being a positive integer.

It should be understood that in response to that the resource difference value is relatively large, it indicates that the second proxy server may have a relatively high utilization rate of resources, and it is desired to ensure that the utilization of resources of the second proxy server is to be effectively shared. During using the first proxy server to share the utilization of resources of the first m proxy servers of the second proxy servers in the sequenced result, the first proxy server may be used to preferentially share the utilization of resources of the first m proxy servers of the second proxy servers in the sequenced result; in response to that the first proxy server can share the utilization of resources of the first m proxy servers of the second proxy servers in the sequenced result, the first proxy server may also be used to share the utilization of resources of other second proxy servers.

In a specific example, the proxy server with an average value of the expectation of utilization of resources greater than the second threshold may be used as the second proxy server, so that a division of second proxy servers is more stable.

In some implementations, the second proxy servers may be sequenced according to maximum values of expectations of utilization of resources, and the first proxy server is used to preferentially share the utilization of resources of the second proxy server with a relatively large maximum value of the expectation of utilization of resources.

It should be noted that, since the resources may be various, in practical applications, the proxy servers may be classified according to the resources, and then the resources are scheduled by using the method in the first implementation and/or the second implementation according to the classified proxy servers. In order to more clearly illustrate the resource scheduling method provided in the present disclosure, following is described by taking a case where proxy servers is divided into six classes for an application scenario of cloud video service (i.e., focusing on bandwidth resources) as an example.

In Queue 1, proxy servers with relatively low utilization rates of bandwidth resources and normal utilization rates of processing resources (each utilization rate of bandwidth resources is smaller than 20%, and an average utilization rate of resources of CPU, memory and storage ranges from 20% to 80%) may be used as first proxy servers, which forms a resource pool for sharing the utilization of resources of other proxy servers.

In the scheduling method, the proxy servers are sequenced according to an ascending sequence of utilization rates of bandwidth resources, the proxy server with a lower utilization rate of bandwidth resources is preferentially selected for sharing the utilization of resources.

In Queue 2, proxy servers have normal utilization rates of bandwidth resources and stable utilization rates of processing resources (each utilization rate of bandwidth resources ranges from 20% to 80%, and an average utilization rate of resources of CPU, memory and storage ranges from 20% to 80%).

In the scheduling method, the Queue 2 is not processed.

In Queue 3, proxy servers with relatively high utilization rates of bandwidth resources and normal utilization rates of processing resources (each utilization rate of bandwidth resources exceeds 80%, and an average utilization rate of resources of CPU, memory and storage ranges from 20% to 80%) may be used as second proxy servers.

In the scheduling method, the proxy servers in Queue 1 may be selected for sharing the utilization of resources of the proxy servers in Queue 3, or the bandwidth resources of the proxy servers in Queue 3 may be increased within an allowed range, or virtual machine migration may be requested to the service end, or a new proxy server may be created at a position proximity to the proxy servers in Queue 3 for sharing the utilization of resources of the proxy servers in Queue 3.

In Queue 4, proxy servers with relatively high utilization rates of bandwidth resources and relatively high utilization rates of processing resources (each utilization rate of bandwidth resources exceeds 80%, and an average utilization rate of resources of CPU, memory and storage exceeds 80%) may be used as second proxy servers.

In the scheduling method, the bandwidth resources of the proxy server are increased within a range allowed by a quota, to make the utilization of resources of the proxy server with the increased bandwidth resources approximate to that of proxy servers in Queue 6. If the utilization rate of resources of the proxy server is still too high after the bandwidth resources of the proxy server are increased, expectations of utilization of resources of bandwidth, CPU, memory and storage of each proxy server are predicted according to historical data, the proxy servers are sequenced in a descending sequence according to difference values between predicted maximum values (maximum values of the expectations of utilization of resources) and predicted average values (average values of the expectations of utilization of resources) of the proxy servers, then the proxy server with the lowest utilization rate of resources is selected from the Queue 1 to share the utilization of resources of the proxy servers with the increased resources, to make the utilization of resources of the proxy server with the increased resources approximate to that of the proxy servers in Queue 6. If no appropriate proxy server exists in the Queue 1, a new proxy server is requested to be created at a position proximity to the proxy server with the utilization of resources to be shared, the new proxy server sharing the utilization of resources is added into the Queue 1, and the proxy server with the utilization of resources shared is added into the Queue 6.

In Queue 5, proxy servers with relatively low utilization rates of bandwidth resources and relatively high utilization rates of processing resources (each utilization rate of bandwidth resources is smaller than 20%, and an average utilization rate of resources of CPU, memory and storage exceeds 80%) may be used as first proxy servers.

In the scheduling method, proxy servers with maximum values of predicted expectations of utilization of bandwidth resources higher than actual utilizations are sequenced in a descending sequence, other proxy servers are added into the Queue 1, and the proxy server with a physical location near the proxy server with the utilization of resources is selected from an end of the Queue 1 to share the utilization of resources of the proxy server at the head of the Queue 1. If there are insufficient resources in the Queue 5, the proxy server for sharing the utilization of resources is selected from Queue 1.

In Queue 6, proxy servers have normal utilization rates of bandwidth resources and relatively high utilization rates of processing resources (each utilization rate of bandwidth resources ranges from 20% to 80%, and an average utilization rate of resources of CPU, memory and storage exceeds 80%).

In the scheduling method, an expectation of utilization of bandwidth resources of each proxy server is predicted according to the historical data, the proxy servers are sequenced in an ascending sequence according to difference values between maximum values and average values of expectations of utilization of bandwidth resources, and the proxy servers with relatively low utilization rates of bandwidth resources are sequentially selected from the Queue 1 to share the utilization of resources of the proxy servers in the Queue 6. If the resources in the Queue 1 are insufficient, a new proxy server is requested to be created at a position proximity to at least one proxy server in the end of the Queue 6 to share the utilization of resources, and is added into the Queue 1 for further sharing. After the utilization of resources is shared, if there are still remaining resources for the proxy servers in the Queue 1, the remaining resources may be associated with the proxy servers in Queues 4 and 6 as a backup. For other proxy servers, virtual resources thereof may be reduced by configuring, or the other proxy servers may be migrated, closed or the like.

According to the resource scheduling method in the second implementation, by predicting the expectation of utilization of resources of the second proxy server, the first proxy server is used to share the utilization of resources of the second proxy servers with a relatively large resource difference value in the sequenced result (i.e., part of utilized resources of each second proxy server with the relatively large resource difference value are provided by the first proxy server), resources desired by the second proxy server with the utilization of resources that may be relatively changed significantly can be ensured, the resource scheduling is further optimized, and stability of service quality of the proxy server is improved.

In addition, it can be understood by those skilled in the art that a division between operations of the above method is only for a purpose of clear description, during implementing the method, the operations may be combined into one operation or some operations each may be further split into several operations, as long as the same logical relationship is included, which are within the protection scope of the present disclosure; unnecessary modifications or designs being added or introduced into the algorithm or process, without changing the core design of the algorithm and process is within the protection scope of the present disclosure.

Figure 3:
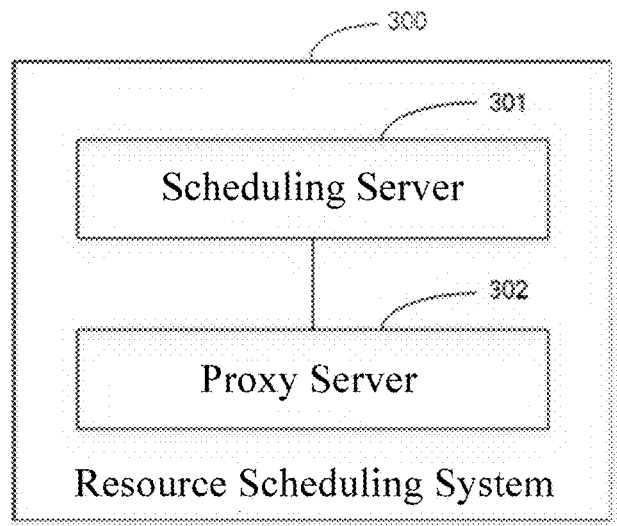
FIG. 3 is a schematic block diagram of a resource scheduling system.

A third implementation of the present disclosure relates to a resource scheduling system 300, and as shown in FIG. 3, the resource scheduling system 300 includes a scheduling server 301 and a plurality of proxy servers 302 deployed on a virtual machine.

The scheduling server 301 is configured to acquire utilization rates of resources of a plurality of proxy servers, the plurality of proxy servers being deployed on a virtual machine, and use at least one first proxy server to share a utilization of resources of at least one second proxy server, where the utilization rate of resources of each of the at least one first proxy server is smaller than a first threshold, the utilization rate of resources of each of the at least one second proxy server is greater than a second threshold, and the first threshold is smaller than the second threshold.

In some implementations, the scheduling server 301 is further configured to sequence first proxy servers according to a sequence of the utilization rates of resources of the first proxy servers from low to high, and select first n proxy servers of the first proxy servers to share the utilization of resources of the second proxy server, n being a positive integer.

In some implementations, the scheduling server 301 is further configured to, in response to that there is a remaining first proxy server, recycle the remaining first proxy server.

In some implementations, the scheduling server 301 is further configured to predict an expectation of utilization of resources of each second proxy server, sequence second proxy servers according to a sequence of resource difference values from large to small, the resource difference value of each second proxy server being a difference value between a maximum value and an average value of the expectation of utilization of resources of the second proxy server, and use the first proxy server to share the utilization of resources of first m proxy servers of the second proxy servers, m being a positive integer.

In some implementations, the scheduling server 301 is further configured to, in response to that the utilization of resources of a certain second proxy server is not shared, create at least one new proxy server, and use the at least one new proxy server to share the utilization of resources of the second proxy server.

In some implementations, the scheduling server 301 is further configured to increase resources of the second proxy server, and in response to that the utilization rate of resources of the second proxy server with the increased resources is still greater than the second threshold, use the first proxy server to share the utilization of resources of the second proxy server with the increased resources.

In some implementations, the resources are bandwidth resources, and the proxy server is a server for providing a cloud video service.

In some implementations, the resources are processing resources including computing resources and storage resources.

Figure 4:
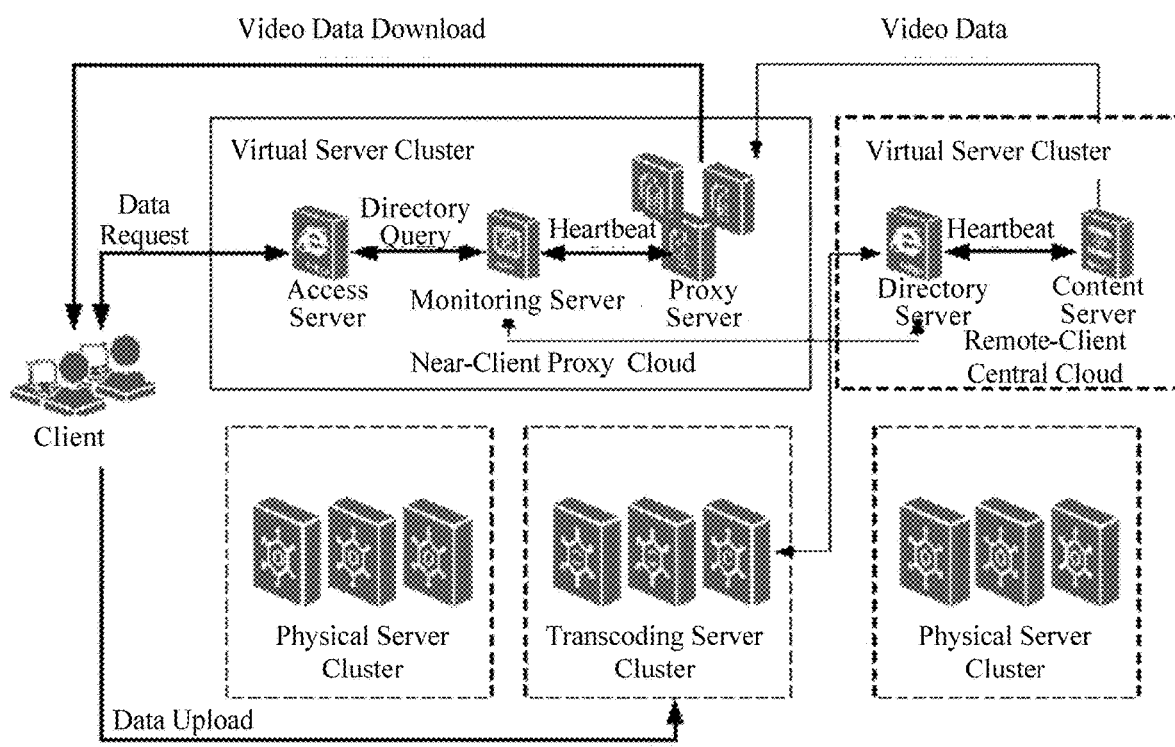
FIG. 4 is an exemplary diagram of a resource scheduling system applied in a cloud video service.

Referring to FIG. 4, which shows an exemplary diagram of the resource scheduling system, applied in cloud video service, provided in the third implementation, the scheduling server 301 is a monitoring server in FIG. 4. Specifically, in FIG. 4, in addition to the scheduling server 301 (i.e., monitoring server) and proxy servers of the resource scheduling system 300, a client, an access server, a directory server, a content server, and a transcoding server are further included. A physical server cluster is a host of a virtual server cluster. The client may be a computer, a television, a mobile phone or other digital terminals, is connected with the access server through a wireless network, a cable television network or the internet, and is configured for acquiring the video service of a cloud network. A central cloud is formed by the directory server and the content server, the directory server provides a service for searching a video object for a proxy cloud, and the content server stores complete backups of all video objects. A near-client proxy cloud is formed by the access server, the monitoring server, the proxy servers and the transcoding server. The access server is used as an interface for requesting service from the client to the proxy cloud, receives a service request of the client, acquires a list of proxy servers capable of providing services and respective operating states of the proxy servers from the monitoring server, and selects a proper proxy server to establish a connection with the client and provide a service. The monitoring server is configured to collect distribution information of video resources in each proxy server and provide a service for searching the video resources for the client, and by using the resource scheduling method provided in the first implementation or the second implementation of the present disclosure, load of the proxy servers are balanced, resources are scheduled and allocated for each proxy server, and information of the operating states of the proxy servers are collected, that is, the server for providing a service for data request of the client is selected and related virtual resources are scheduled; the transcoding server is acted by a special physical server and is configured to convert video objects of different codes uploaded by a provider or a user into video objects of codes conforming to a video service platform of the cloud network.

Figure 5:
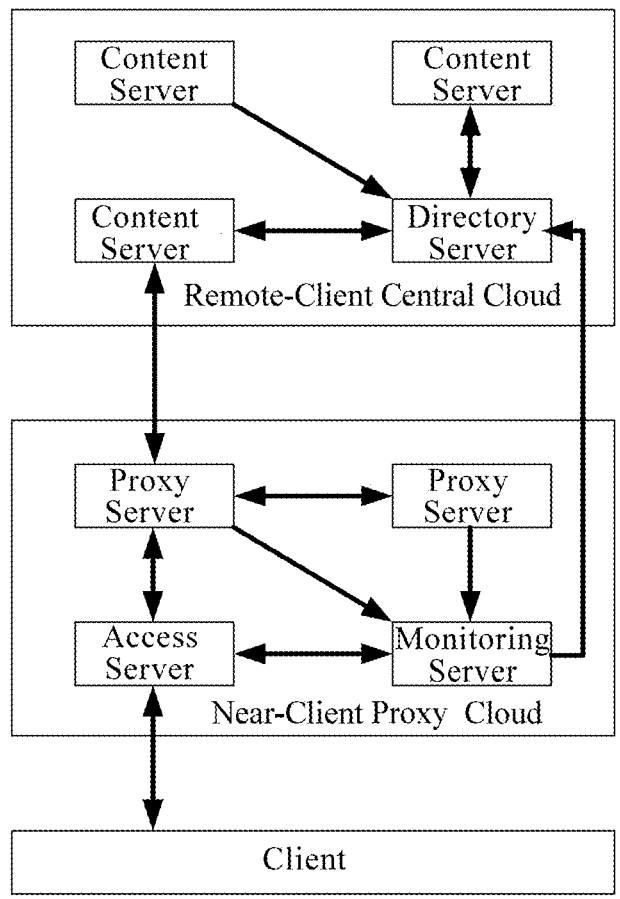
FIG. 5 is a schematic flowchart corresponding to FIG. 4.

FIG. 5 is a schematic flowchart illustrating a process of FIG. 4 during the client acquiring the video service; referring to FIG. 5, the process specifically includes: 1. the client is connected to the access server in the cloud through Internet, and submits a video service request (including a video object); 2. the access server acquires a list of proxy servers for providing services for the client from the monitoring server; 3. the monitoring server searches for the proxy server for providing a service for the client, inquires resources from the directory server in the central cloud in response to that no resource requested by the client exist in the proxy cloud, and in response to that the resources requested by the client exist in the proxy cloud, goes to operation 6; 4. the directory server in the central cloud searches and selects the content server storing data requested by the client; 5. the content server transmits the requested resources to the proxy server (for example, may be the first proxy server) in the proxy cloud; 6. the monitoring server selects the first proxy server to serve the client according to grasped resources and the information of the operating states of the proxy server, and balances utilization rates of resources of the proxy servers, and returns service information to the access server after selecting the first proxy server; 7. the access server establishes a connection between the proxy server and the client; 8, the proxy server responds to the data request of the client; 9. the client starts playing video after receiving and buffering part of data, and continues to request rest data.

It should be noted that the third implementation is a system implementation corresponding to the first and second implementations, and may be implemented in cooperation with the first and second implementations. The related technical details mentioned in the first implementation and the second implementation are still valid in the third implementation, and are not described herein again in order to reduce repetition. Accordingly, the related technical details mentioned in the third implementation may be applied to the first implementation and the second implementation.

It should be noted that, each module related in the third implementation is a logic module, and in practical applications, each logic component may be one physical component, or may be a part of one physical component, or may be implemented by a combination of multiple physical components. In addition, in order to highlight the innovative part of the present disclosure, some components being less closely related to solving the technical problem proposed by the present disclosure is not introduced in the third implementation, which does not indicate that there are no other components in the third implementation.

Figure 6:
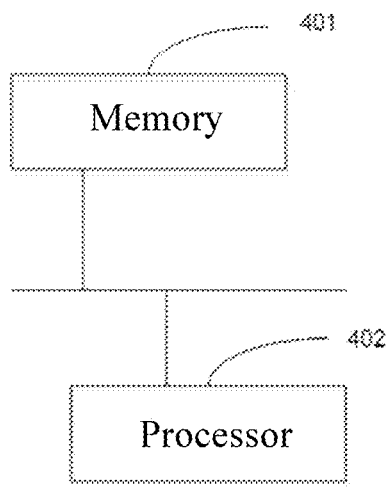
FIG. 6 is a schematic structural diagram of an electronic device.

A fourth implementation of the present disclosure relates to an electronic device, and as shown in FIG. 6, the electronic device includes: at least one processor 402; and a memory 401 communicatively connected with the at least one processor 402; the memory 401 stores instructions to be executed by the at least one processor 402, the instructions, executed by the at least one processor 402, cause the at least one processor 402 to perform the resource scheduling method described above.

The memory 401 and processor 402 are connected through a bus, the bus may include any number of interconnected buses and bridges, and connects various circuits of one or more processors 402 and the memory 401 together. The bus may further connect together various circuits of peripherals, voltage regulators, power management circuits, and the like, which are well known in the art, and thus are not repeated here. A bus interface provides an interface between the bus and a transceiver. The transceiver may be one element or a plurality of elements, such as a plurality of receivers and transmitters, providing a means for communicating with various other apparatuses over a transmission medium. Data processed by the processor 402 is transmitted over a wireless medium through an antenna, and the antenna further receives data and transmits the data to the processor 402.

The processor 402 manages the bus, performs general processing, and may further provide various functions including timing, peripheral interfaces, voltage regulation, power management, and other control functions. The memory 401 may be used to store data used by the processor 402 in performing operations.

The present application further provides a computer-readable storage medium having a computer program stored thereon, the computer program, executed by a processor, causes the processor to implement the resource scheduling method described above.

It should be understood, by those skilled in the art, that all or part of the operations in the method described above may be implemented by a program instructing related hardware, the program is stored in a storage medium and includes several instructions for causing a device (which may be a single-chip computer, a chip, or the like) or a processor to execute all or part of operations of the method provided in the present application. The aforementioned storage medium includes: a U-disk, a read-only memory (ROM), a random access memory (RAM), a removable hard disk, a magnetic disk, an optical disk, or various medium capable of storing program codes.

It should be understood by those skilled in the art that the above implementations are examples of implementations of the present application, in practical applications, various changes in form and details may be made without departing from the scope and spirit of the present application.

What is claimed is:

1. A resource scheduling method, comprising:
   acquiring utilization rates of resources of a plurality of proxy servers, the plurality of proxy servers being deployed on a virtual machine; and
   using at least one first proxy server to share a utilization of resources of at least one second proxy server, wherein the utilization rate of resources of each of the at least one first proxy server is smaller than a first threshold, the utilization rate of resources of each of the at least one second proxy server is greater than a second threshold, and the first threshold is smaller than the second threshold,
   the method further comprising: before using at least one first proxy server to share the utilization of resources of at least one second proxy server, sequencing the at least one first proxy server according to a sequence of the utilization rates of resources from low to high, to obtain a first sequenced result; and
   the using at least one first proxy server to share a utilization of resources of at least one second proxy server comprises:
   determining first n proxy servers of first proxy servers in the first sequenced result, n being a positive integer; and
   using the first n proxy servers of the first proxy servers to share the utilization of resources of the at least one second proxy server.

2. The resource scheduling method according to claim 1, further comprising:
   after using at least one first proxy server to share the utilization of resources of at least one second proxy server, in response to that a number of the at least one first proxy server is determined to be greater than the n, recycling other first proxy servers in the at least one first proxy server except the first n proxy servers of the first proxy servers.

3. The resource scheduling method according to claim 1, further comprising:
   before using at least one first proxy server to share the utilization of resources of at least one second proxy server, predicting an expectation of utilization of resources of the at least one second proxy server; and
   sequencing the at least one second proxy server according to a sequence of resource difference values from large to small to obtain a second sequenced result, wherein the resource difference value of each second proxy server is a difference value between a maximum value and an average value of the expectation of utilization of resources of the second proxy server, and
   the using at least one first proxy server to share a utilization of resources of at least one second proxy server comprises:
   determining first m proxy servers of second proxy servers in the second sequenced result, m being a positive integer; and
   using the at least one first proxy server to share the utilization of resources of the first m proxy servers of the second proxy servers.

4. The resource scheduling method according to claim 3, further comprising:
   after using at least one first proxy server to share the utilization of resources of at least one second proxy server, in response to that a number of the at least one second proxy server is determined to be greater than the m, creating at least one third proxy server; and
   using the at least one third proxy server to share the utilization of resources of other second proxy servers in the at least one second proxy server except the first m proxy servers of the second proxy servers.

5. The resource scheduling method according to claim 1, further comprising:
   before using at least one first proxy server to share the utilization of resources of at least one second proxy server, increasing resources of the at least one second proxy server, and
   the using at least one first proxy server to share a utilization of resources of at least one second proxy server comprises:
   in response to that the utilization rate of resources of the second proxy server with the increased resources is determined to be still greater than the second threshold, using the at least one first proxy server to share the utilization of resources of the second proxy server with the increased resources.

6. The resource scheduling method according to claim 1, wherein the resources are bandwidth resources, and the plurality of proxy servers are configured to provide a cloud video service.

7. The resource scheduling method according to claim 1, wherein the resources are processing resources comprising computing resources and storage resources.

8. A resource scheduling system, comprises a scheduling server which includes a processor and a memory, and a plurality of proxy servers deployed on a virtual machine, wherein the scheduling server is configured to:

acquire utilization rates of resources of a plurality of proxy servers, the plurality of proxy servers being deployed on a virtual machine; and use at least one first proxy server to share a utilization of resources of at least one second proxy server, wherein the utilization rate of resources of each of the at least one first proxy server is smaller than a first threshold, the utilization rate of resources of each of the at least one second proxy server is greater than a second threshold, and the first threshold is smaller than the second threshold, the system further comprising: before using at least one first proxy server to share the utilization of resources of at least one second proxy server, sequencing the at least one first proxy server according to a sequence of the utilization rates of resources from low to high, to obtain a first sequenced result; and the using at least one first proxy server to share a utilization of resources of at least one second proxy server comprises:

determining first n proxy servers of first proxy servers in the first sequenced result, n being a positive integer; and using the first n proxy servers of the first proxy servers to share the utilization of resources of the at least one second proxy server.

9. An electronic device, comprising:

at least one processor; and a memory communicatively connected with the at least one processor, wherein, the memory stores instructions to be executed by the at least one processor, the instructions, executed by the at least one processor, cause the at least one processor to perform the method according to claim 1.

10. A non-transitory computer-readable storage medium having a computer program stored thereon, the computer program executed by a processor, causes the processor to perform the method according to claim 1.

* * * * *